(12) United States Patent
Ueki et al.

(10) Patent No.: US 9,772,002 B2
(45) Date of Patent: Sep. 26, 2017

(54) VIBRATION ISOLATOR

(71) Applicant: BRIDGESTONE CORPORATION, Tokyo (JP)

(72) Inventors: Akira Ueki, Kamakura (JP); Masakazu Nagasawa, Yokohama (JP); Shuhei Ono, Yokohama (JP); Yasuyuki Nagashima, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/819,745

(22) Filed: Aug. 6, 2015

(65) Prior Publication Data

US 2016/0053845 A1     Feb. 25, 2016

(30) Foreign Application Priority Data

Aug. 20, 2014  (JP) ................................ 2014-167273

(51) Int. Cl.
*B60G 15/04*     (2006.01)
*F16F 13/10*     (2006.01)
(Continued)

(52) U.S. Cl.
CPC .......... *F16F 13/107* (2013.01); *B60K 5/1208* (2013.01); *F16F 13/08* (2013.01)

(58) Field of Classification Search
CPC .......... F16F 13/08; F16F 13/10; F16F 13/107; B60K 5/12; B60K 5/1208
(Continued)

(56) References Cited

U.S. PATENT DOCUMENTS 4,227,056 A * 10/1980 Johnston ................ H01H 9/285
                                                    200/4
4,469,316 A *  9/1984 van den Boom ....... F16F 13/08
                                                    267/113
(Continued)

FOREIGN PATENT DOCUMENTS

JP        63188357 U     12/1988
JP      2008-303910 A    12/2008
(Continued)

OTHER PUBLICATIONS

International Search Report dated Sep. 1, 2015 by the International Searching Authority issued in counterpart International application No. PCT/JP2015/070669.

*Primary Examiner* — Christopher Schwartz
(74) *Attorney, Agent, or Firm* — Sughrue Mion, PLLC

(57) ABSTRACT

A vibration isolator (10) is a liquid-enclosed vibration isolator and includes: a tubular first mounting member (11) connected to one of a vibration generator and a vibration absorber, and a second mounting member (12) connected to the other; an elastic body (13) elastically connecting the mounting members; and a partition member (16) partitioning a liquid chamber (19) in the first mounting member (11) within which a liquid (L) is enclosed into a primary liquid chamber (14) that uses the elastic body (13) as a part of a wall surface thereof and a secondary liquid chamber (15), wherein the partition member (16) is formed with a restriction passage (24) communicating the primary and secondary liquid chambers (14, 15) with each other, and a porous body (28) having numerous pores (31), which are disposed in parallel so as to communicate a side of the primary liquid chamber (14) and a side of the secondary liquid chamber (15) with each other, is arranged in the restriction passage (24).

12 Claims, 3 Drawing Sheets

(51) Int. Cl.
*B60K 5/12* (2006.01)
*F16F 13/08* (2006.01)

(58) Field of Classification Search
USPC ........ 267/140.11, 140.13; 248/550, 562, 566
See application file for complete search history.

(56) References Cited

U.S. PATENT DOCUMENTS

| | | | | |
|---|---|---|---|---|
| 4,645,188 A * | 2/1987 | Jordens | ................... | F16F 13/06 267/140.13 |
| 4,666,137 A * | 5/1987 | Hamaekers | ........... | F16F 13/106 137/493 |
| 4,697,793 A * | 10/1987 | Reuter | ................. | F16F 13/105 267/140.13 |
| 4,773,634 A * | 9/1988 | Hamaekers | ........... | F16F 13/106 137/493 |
| 4,903,951 A * | 2/1990 | Miyamoto | ............ | F16F 13/105 267/140.13 |
| 4,925,162 A * | 5/1990 | Kojima | ................ | F16F 13/106 267/122 |
| 4,928,935 A * | 5/1990 | Matsui | .................... | F16F 13/30 267/140.13 |
| 5,853,063 A * | 12/1998 | Meyerink | ............. | F16F 13/106 267/140.13 |
| 6,311,963 B1 * | 11/2001 | Suzuki | .................. | F16F 13/108 267/140.13 |
| 2004/0124571 A1 * | 7/2004 | Gold | ..................... | F16F 9/3405 267/124 |
| 2012/0228813 A1 * | 9/2012 | Masuda | ................ | F16F 13/106 267/140.13 |
| 2012/0292838 A1 * | 11/2012 | Yamamoto | ............ | F16F 13/106 267/140.13 |
| 2016/0053844 A1 * | 2/2016 | Nagasawa | ............... | F16F 13/08 267/140.13 |
| 2016/0053846 A1 * | 2/2016 | Nagasawa | ............... | B60K 5/1208 267/140.13 |

FOREIGN PATENT DOCUMENTS

| | | |
|---|---|---|
| JP | 2012026510 A | 2/2012 |
| JP | 2012-172832 A | 9/2012 |
| JP | 2014126154 A | 7/2014 |

* cited by examiner

VIBRATION ISOLATOR

BACKGROUND OF THE INVENTION

Field of the Invention

The present invention relates to a vibration isolator that is applied to, for instance, a motor vehicle or an industrial machine so as to absorb and attenuate vibrations of a vibration generator such as an engine.

Priority is claimed on Japanese Patent Application No. 2014-167273, filed Aug. 20, 2014, the content of which is incorporated herein by reference.

Description of Related Art

Conventionally, such a vibration isolator has been known as being made up of a tubular first mounting member that is connected to one of a vibration generator and a vibration absorber, a second mounting member that is connected to the other, an elastic body that connects these mounting members, and a partition member that partitions a liquid chamber in the first mounting member within which a liquid is enclosed into a primary liquid chamber and a secondary liquid chamber. The partition member is formed with a restriction passage that communicates the primary and secondary liquid chambers with each other. In the vibration isolator, when vibration is input, both of the mounting members are relatively displaced while elastically deforming the elastic body, change a liquid pressure of the primary liquid chamber, and cause the liquid to flow to the restriction passage, thereby absorbing and attenuating the vibration.

Incidentally, in the vibration isolator, for example, when a great load (vibration) is input due to, for instance, roughness of a road surface, the liquid pressure of the primary liquid chamber is sharply raised, and then a load is input in the opposite direction by, for instance, rebound of the elastic body, a pressure of the primary liquid chamber sometimes abruptly becomes a negative pressure. Due to such an abrupt change in pressure, cavitation occurs, which creates numerous bubbles in the liquid. Further, due to the cavitation collapse in which the created bubbles collapse, abnormal noises sometimes occur.

Thus, for example, like a vibration isolator disclosed in Japanese Unexamined Patent Application, First Publication No. 2012-172832, a constitution in which a valve body is provided inside the restriction passage, and thereby even when vibration having a large amplitude is input, the change to the negative pressure in the primary liquid chamber is limited is known.

SUMMARY OF THE INVENTION

However, in the existing vibration isolator, there is a problem in that a manufacturing cost is increased because the valve body is provided to make a structure complicated, and because tuning of the valve body is also required. In addition, a degree of freedom of design is reduced due to the provision of the valve body. As a result, a vibration-proof characteristic may also be reduced.

The present invention has been made in consideration of the above circumstances, and an object of the present invention is to provide a vibration isolator capable of limiting generation of abnormal noises resulting from cavitation collapse without reducing a vibration-proof characteristic in a simple structure.

To resolve the above problems, the present invention proposes the following means.

A liquid-enclosed vibration isolator and includes: a first mounting member configured to have a tubular shape and connected to one of a vibration generator and a vibration absorber, and a second mounting member connected to the other of the vibration generator and the vibration absorber; an elastic body configured to elastically connect the first and second mounting members; and a partition member and configured to partition a liquid chamber in the first mounting member within which a liquid is enclosed into a primary liquid chamber that uses the elastic body as a part of a wall surface thereof and a secondary liquid chamber, wherein the partition member is formed with a restriction passage configured to communicate the primary and secondary liquid chambers with each other, and a porous body having a plurality of pores, which are disposed substantially in parallel with each other so as to communicate the primary liquid chamber and the secondary liquid chamber with each other, is arranged in the restriction passage.

In the present invention, when the vibration is input, both of the mounting members are relatively displaced while elastically deforming the elastic body, and a liquid pressure of the primary liquid chamber is changed. The liquid is configured to flow between the primary liquid chamber and the secondary liquid chamber through the restriction passage. When this happens, for example, even if bubbles are generated in the restriction passage, since the porous body having the numerous pores is arranged in the restriction passage, when the bubbles reach the porous body and pass through the pores, the bubbles are divided into fine bubbles by the porous body, and then the fine bubbles are dispersed, i.e., they are not coalesced. Accordingly, for example, even if cavitation collapse in which the bubbles collapse occurs, abnormal noises that are generated are limited to be weak.

Also, the pores may be reduced in diameter in a direction moving from the secondary liquid chamber toward the primary liquid chamber.

In this case, when the bubbles pass through the porous plate toward the primary liquid chamber, the bubbles pass through the pores, thereby being divided into finer bubbles. The finer bubbles are dispersed.

In addition, the porous body may be disposed closer to the primary liquid chamber than the secondary liquid chamber.

In this case, for example, immediately after the bubbles generated in the restriction passage are finely divided and dispersed by the pores of the porous body, the dispersed bubbles flow into the primary liquid chamber. Thus, growth of the fine bubbles is prevented, and therefore abnormal noises are reliably limited to be weak. That is, for example, the bubbles generated in the restriction passage are considered to grow toward the primary liquid chamber whose pressure has become negative. However, as described above, immediately after the bubbles pass through the porous body, the bubbles flow into the side of the primary liquid chamber, and thus the growth thereof is limited.

DETAILED DESCRIPTION OF THE INVENTION

Hereinafter, an embodiment of a vibration isolator according to the present invention will be described based on the drawings.

Figure 1:
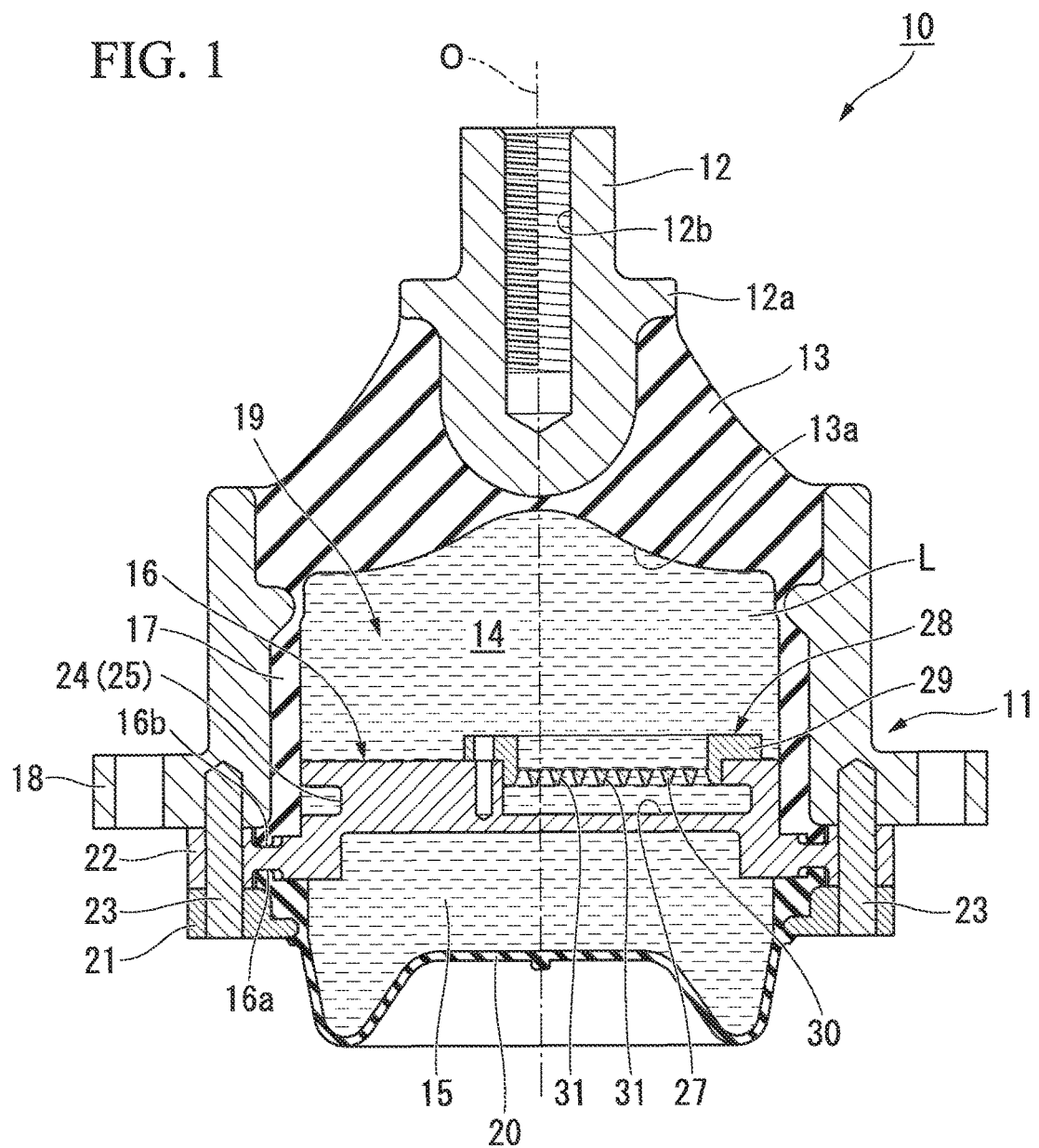
FIG. 1 is a longitudinal sectional view of a vibration isolator according to an embodiment of the present invention.
Figure 2:
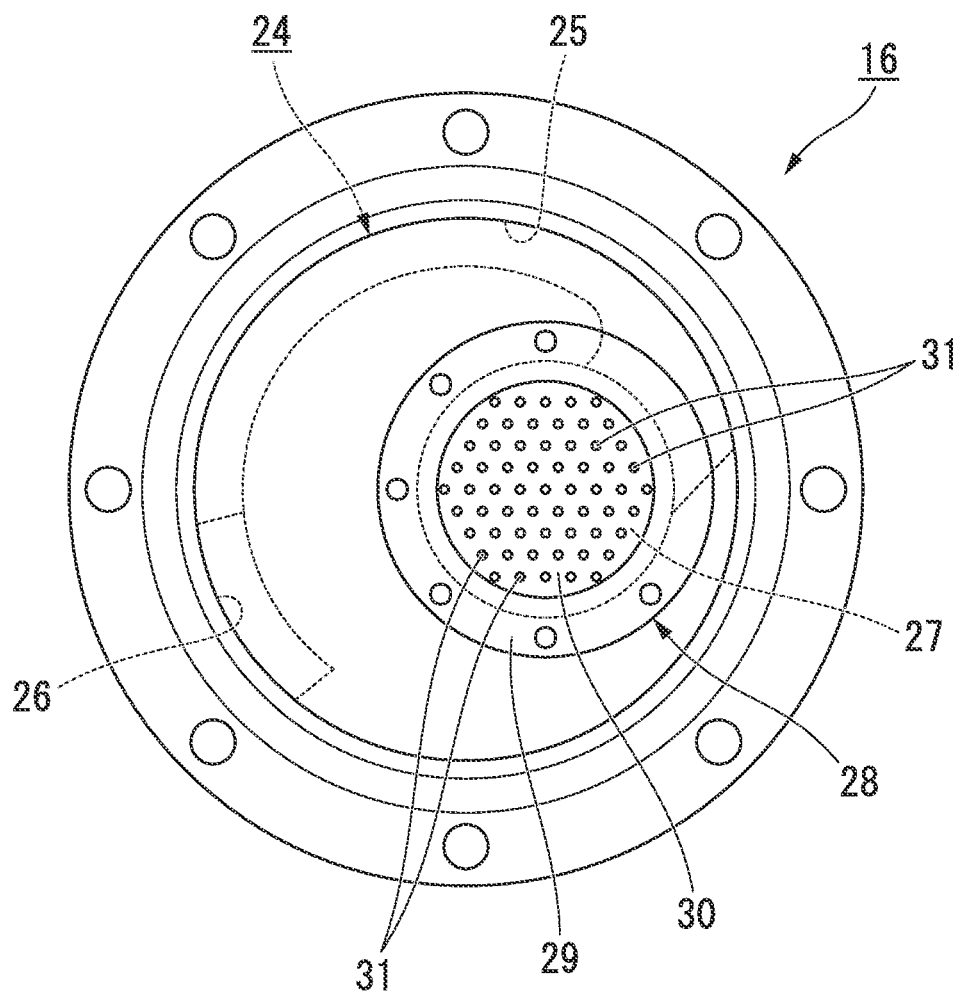
FIG. 2 is a top view of a partition member.
Figure 3:
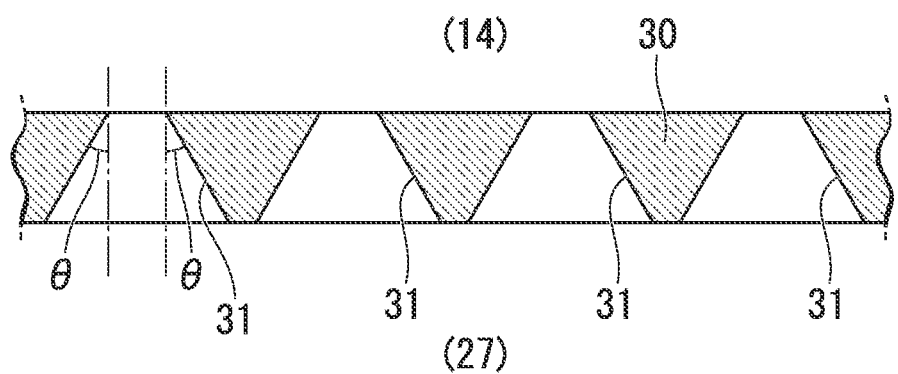
FIG. 3 is a longitudinal sectional view of an essential part in a porous plate for describing fine pores.

FIG. 1 is a longitudinal sectional view of a vibration isolator 10 taken along an axis O in the present embodiment. FIG. 2 is a top view of a partition member. FIG. 3 is a longitudinal sectional view of an essential part in a porous plate showing fine pores.

Note that a symbol O shown in FIG. 1 indicates a central axis of the vibration isolator 10, and is hereinafter referred to simply as "axis O." Also, a direction parallel to the axis O is referred to as an "axial direction," and a direction around the axis O is referred to as a "circumferential direction."

As shown in FIG. 1, the vibration isolator 10 is equipped with a first mounting member 11 that is connected to one of a vibration generator and a vibration absorber and has a tube shape, a second mounting member 12 that is connected to the other of the vibration generator and the vibration absorber, an elastic body 13 that elastically connects the first and second mounting members 11 and 12, and a partition member 16 that partitions an interior of the first mounting member 11 into primary and secondary liquid chambers 14 and 15 to be described below. Each of the members is formed in a circular or annular shape when viewed from the top, and is disposed coaxially with the axis O. In addition, hereinafter, the side of the second mounting member 12 in the axial direction is referred to as an upper side, and the side of the partition member 16 is referred to as a lower side.

When the vibration isolator 10 is, for example, mounted in a motor vehicle, the second mounting member 12 is connected to an engine acting as the vibration generator, and the first mounting member 11 is connected to a vehicle body acting as the vibration absorber. Thereby, vibration of the engine is inhibited from being transmitted to the vehicle body.

The second mounting member 12 is a columnar member extending in the axial direction, and a lower end thereof is formed in a hemispherical surface shape. The second mounting member 12 has a flange 12a above the lower end of the hemispherical surface shape. The second mounting member 12 has a threaded hole 12b that is formed in an upper portion thereof and extends downward from an upper end face thereof. A bolt (not shown) that becomes a mounting tool of the engine side is configured to be screwed into the threaded hole 12b. In addition, the second mounting member 12 is disposed at the side of an upper end opening of the first mounting member 11 via the elastic body 13.

The elastic body 13 is a rubber body that is vulcanized and adhered to the upper end opening of the first mounting member 11 and a lower end side outer circumferential surface of the second mounting member 12 and is interposed between these, and blocks the upper end opening of the first mounting member 11 from above. An upper end of the elastic body 13 comes into contact with a flange 12a of the second mounting member 12, and thereby the elastic body 13 comes into sufficiently close contact with the second mounting member 12, and is configured to follow displacement of the second mounting member 12 better. In addition, a lower end of the elastic body 13 is integrally formed with a rubber membrane 17 that liquid-tightly covers an inner circumferential surface of the first mounting member 11 and a part of a lower end face of the first mounting member 11. As the elastic body 13, an elastic body formed of a synthetic resin in addition to the rubber may also be used.

The first mounting member 11 is shaped of a cylinder having a flange 18 at a lower end thereof, and is configured to be connected to, for instance, the vehicle body acting as the vibration absorber via the flange 18. The first mounting member 11 is configured as described above such that the upper end opening thereof is blocked by the elastic body 13, and is formed with a liquid chamber 19 under the elastic body 13. In the present embodiment, the partition member 16 is provided at the opening side of the lower end of the first mounting member 11, and a diaphragm 20 is further provided below the partition member 16.

The diaphragm 20 is shaped of a bottomed cylinder formed of an elastic material such as rubber or a soft resin. An open end of an upper portion of the diaphragm 20 is liquid-tightly engaged with an annular mounting groove 16a formed in the partition member 16. In this state, an outer circumference of an upper end of the diaphragm 20 is pressed against the side of the partition member 16 by a ring-shaped retainer 21.

The partition member 16 is formed with a flange 22 on an outer circumference thereof, and the retainer 21 is brought into contact with the flange 22.

In addition to the constitution as described above, the flange 22 of the partition member 16 and the retainer 21 are brought into contact with an open edge of the lower end of the first mounting member 11 in that order, and are fixed by a plurality of screws 23. Thereby, the diaphragm 20 is mounted on the lower end opening of the first mounting member 11 via the partition member 16. In the present embodiment, the diaphragm 20 is formed such that a bottom thereof is deep at an outer circumference side thereof and is shallow in the middle thereof. However, in addition to such a shape, a shape of the diaphragm 20 may employ various conventionally known shapes.

Thus, in this way, the diaphragm 20 is mounted on the first mounting member 11 via the partition member 16. Thereby, as described above, the liquid chamber 19 is formed in the first mounting member 11. The liquid chamber 19 is arranged in the first mounting member 11, i.e. inside the first mounting member 11 when viewed from the top, and is provided between the elastic body 13 and the diaphragm 20 in a liquid-tightly blocked state. Thus, a liquid L is enclosed (filled) within the liquid chamber 19.

Such a liquid chamber 19 is partitioned into the primary liquid chamber 14 and the secondary liquid chamber 15 with the partition member 16. The primary liquid chamber 14 is formed using a lower end face 13a of the elastic body 13 as a part of a wall surface thereof, and is a space surrounded by the elastic body 13, the rubber membrane 17 that liquid-tightly covers the inner circumferential surface of the first mounting member 11, and the partition member 16, and an internal volume thereof is changed by deformation of the elastic body 13. The secondary liquid chamber 15 is a space surrounded by the diaphragm 20 and the partition member 16, and an internal volume is changed by deformation of the diaphragm 20. The vibration isolator 10 having this constitution is mounted and used such that the primary liquid chamber 14 is located below in the vertical direction and the secondary liquid chamber 15 is located above in the vertical direction, and is a compression type device.

An upper surface of the partition member 16 which is at the side of the primary liquid chamber 14 is formed with a retaining groove 16b that liquid-tightly retains a lower end of the rubber membrane 17. Thereby, a space between the rubber membrane 17 and the partition member 16 is liquid-tightly blocked. Also, the partition member 16 is provided with a restriction passage 24 that communicates with the primary and secondary liquid chambers 14 and 15 with each other.

As shown in FIGS. 1 and 2, the restriction passage 24 is equipped with a circumferential groove 25 that is formed at the side of an outer circumferential surface of the partition member 16, a communicating port 26 (see FIG. 2) that communicates the circumferential groove 25 and the secondary liquid chamber 15 with each other, and a guide 27 that communicates with an end of the circumferential groove 25 which is at the side of the primary liquid chamber 14. As shown in FIG. 2, the circumferential groove 25 is formed at the side of the outer circumferential surface of the partition member 16 over almost half of the circumference in the circumferential direction, and the communicating port 26 communicating with the secondary liquid chamber 15 is formed at one end side thereof. Accordingly, the communicating port 26 is set as an opening of the restriction passage 24 which is at the side of the secondary liquid chamber 15. In addition, as shown in FIG. 1, the guide 27 that is open on the side of the primary liquid chamber 14 and is shaped of an approximate circle when viewed from the top is formed at the other end side of the circumferential groove 25.

The guide 27 is a recess that is open on the side of the primary liquid chamber 14 in a circular shape. Accordingly, an opening of the guide 27 is set as the opening of the restriction passage 24 which is at the side of the primary liquid chamber 14. In the guide 27, a flow passage has a larger diameter than other portions of the restriction passage 24. That is, the diameter of the guide 27 is set as the maximum diameter of the restriction passage 24. A porous plate (porous body) 28 is fitted and screwed into the opening of the guide 27 which is at the side of the primary liquid chamber 14. The porous plate 28 is shaped of a disc, is formed of a metal or a resin, and has a flange 29 that comes into contact with and is screwed to an open edge of the guide 27 and a lid 30 that is fitted into the opening of the guide 27 and covers the guide 27. In addition, as shown in FIG. 2, since the porous body 28 is disposed at least center part, preferably throughout a flow passage cross section of the restriction passage 24, a fluid flowing through the restriction passage 24 is necessarily configured to pass through the porous body 28, and numerous pores 31 are formed and disposed in parallel in the lid 30.

These pores 31 each have a circular opening, and are disposed to communicate the side of the primary liquid chamber 14 and the side of the secondary liquid chamber 15 with each other. That is, these pores 31 are disposed in a zigzag shape so as to be almost uniformly disposed throughout the circular lid 30, and are formed such that respective central axes thereof run in the axial direction. In the present embodiment, as shown in FIG. 3, each pore 31 is formed in a tapered shape in which it is reduced in diameter from the guide 27 toward the primary liquid chamber 14. A cross-sectional area of each of the pores 31 may preferably be less than or equal to 25 mm$^2$ (opening diameter of 5.6 mm), and more preferably less than or equal to 17 mm$^2$ (opening diameter of 4.6 mm). As one example, these pores 31 are each formed in such a manner that the length is about 2 mm, the opening diameter of each of the pores at the side of the primary liquid chamber 14 is about 1.2 mm, and walls of each of the pores form a tapered angle of about 30° relative to a direction of flow of the liquid through the pores shown in FIG. 3. However, these dimensions are appropriately changed according to, for example, the size of the vibration isolator 10.

Thus, in the present embodiment, the sum of opening areas of the pores 31 which are at the side having a minimum diameter in such a porous plate 28, i.e. the sum of the opening areas at the side of the primary liquid chamber 14, is more than or equal to half of a minimum value of a flow passage cross-sectional area of the restriction passage 24. In this way, the sum of the opening areas of the pores 31 is set to be more than or equal to half of the minimum value of the flow passage cross-sectional area of the restriction passage 24, and thereby resistance when the liquid L passes through the porous plate 28 is inhibited from being greatly increased. Accordingly, desired attenuation performance of vibration according to the vibration isolator 10 is maintained.

In the present embodiment, since the porous plate 28 is provided for the opening of the guide 27 whose flow passage cross-sectional area is sufficiently large compared to the circumferential groove 25 in which the flow passage cross-sectional area of the restriction passage 24 has a minimum value, the sum of the opening areas of the numerous pores 31 formed in the porous plate 28 is an area that is identical or approximate to a flow passage cross-sectional area of the circumferential groove 25 in which the flow passage cross-sectional area of the restriction passage 24 has a minimum value. Accordingly, in the vibration isolator 10 of the present embodiment, attenuation performance equivalent to attenuation performance of vibration according to the existing vibration isolator is obtained.

In the vibration isolator 10 having such a constitution, when the vibration is input, both of the mounting members 11 and 12 are relatively displaced while elastically deforming the elastic body 13. Then, a liquid pressure of the primary liquid chamber 14 is changed, and the liquid L in the primary liquid chamber 14 flows into the secondary liquid chamber 15 through the restriction passage 24. Also, the liquid L in the secondary liquid chamber 15 flows into the primary liquid chamber 14 through the restriction passage 24. That is, a part of the liquid L in the secondary liquid chamber 15 returns to the primary liquid chamber 14.

In this case, particularly, when the liquid L in the secondary liquid chamber 15 returns to the primary liquid chamber 14 through the restriction passage 24, the pressure of the primary liquid chamber 14 becomes a negative pressure. Thereby, for example, the vapor pressure of the liquid L is reduced in the restriction passage 24, and the liquid L is partly evaporated so that bubbles are created. However, in the present embodiment, since the porous plate 28 is arranged in the opening of the restriction passage 24 which is at the side of the primary liquid chamber 14, when the created bubbles reach the porous plate 28 and pass through the pores 31, the bubbles are divided (split) into fine bubbles by the porous plate 28, and then the fine bubbles are dispersed. Accordingly, for example, even if cavitation collapse occurs in the primary liquid chamber 14, the bubbles are made fine, and thus abnormal noises that occur are limited to be weak.

Thus, according to the vibration isolator 10 of the present embodiment, without employing the complicated structure in which the valve body is provided as in the related art, a simple structure in which the porous plate 28 is merely arranged in the opening of the guide 27 in the restriction passage 24 is employed. Thereby, without causing the problems such as an increase in manufacturing cost and a decrease in a vibration-proof characteristic resulting from a reduction in the degree of freedom of design as in the related art, the occurrence of the abnormal noises can be limited so that the occurrence of the abnormal noises attributed to the cavitation collapse is reduced.

In addition, since the pores 31 of the porous plate 28 are each formed in the tapered shape in which they are gradually reduced in diameter toward the primary liquid chamber 14, when the bubbles pass through the porous plate 28 toward the primary liquid chamber 14, the bubbles are easily split into the fine bubbles by passing through the pores 31, and the fine bubbles are dispersed. Accordingly, the occurrence of abnormal noises due to cavitation collapse can be further limited.

Also, the porous plate 28 is arranged in the opening of the restriction passage 24 which is at the side of the primary liquid chamber 14, and the cross-sectional area of each of the pores 31 is less than or equal to 25 mm$^2$ (opening diameter of 5.6 mm). For this reason, for example, immediately after the bubbles generated in the restriction passage 24 are finely split and dispersed by the pores 31 of the porous plate 28, the bubbles can flow into the primary liquid chamber 14. Thereby, subsequent growth of the fine bubbles can be prevented by the pores 31, and therefore the occurrence of the abnormal noises can be reliably limited to be weak. That is, for example, the bubbles generated in the restriction passage 24 are considered to grow as they approach the primary liquid chamber 14 whose pressure has become negative. However, as described above, immediately after the bubbles are made fine by passing through the porous plate 28, the fine bubbles flow into the side of the primary liquid chamber 14, and thus the growth thereof is limited. Accordingly, the occurrence of the abnormal noises is limited.

The technical scope of the present invention is not limited to the above embodiment, but the present invention may be modified in various ways without departing from the spirit or teaching of the present invention.

For example, in the present embodiment, the pores 31 formed in the porous plate 28 are formed in the tapered shape in which they are gradually reduced in diameter toward the primary liquid chamber 14. However, the pores 31 may be formed in a columnar shape (straight hole shape) rather than the tapered shape. Alternatively, each pore 31 may be formed in a reversely tapered shape in which it is gradually increased in diameter toward the primary liquid chamber 14.

In addition, in the present embodiment, the porous body (porous plate 28) according to the present invention is arranged in the opening of the restriction passage 24 which is at the side of the primary liquid chamber 14. However, the porous body may be arranged in the circumferential groove 25 so as to block the flow passage cross section of the circumferential groove 25, or in the opening of the restriction passage 24 which is at the side of the secondary liquid chamber 15, i.e., in the communicating port 26. When the porous body is arranged in the communicating port 26, the pores 31 thereof may be formed in the tapered shape in which they are gradually reduced in diameter, particularly, toward the primary liquid chamber 14.

Also, in the present embodiment, the partition member 16 is disposed at the lower end of the first mounting member 11, and the flange 22 of the partition member 16 is brought into contact with the lower end face of the first mounting member 11. However, for example, the partition member 16 may be disposed above the lower end face of the first mounting member 11 to a sufficient extent, and the diaphragm 20 may be arranged below the partition member 16, i.e., at the lower end of the first mounting member 11. Thereby, the secondary liquid chamber 15 may be formed from the lower end of the first mounting member 11 to a bottom surface of the diaphragm 20.

Also, in the present embodiment, the compression type vibration isolator 10 in which a positive pressure is applied to the primary liquid chamber 14 by application of a support load has been described. However, the present invention may also be applied to a suspension type vibration isolator which is mounted such that the primary liquid chamber 14 is located below in the vertical direction and the secondary liquid chamber 15 is located above in the vertical direction and in which the negative pressure is applied to the primary liquid chamber 14 by the application of the support load.

In addition, the vibration isolator 10 according to the present invention is not limited to an engine mount of a motor vehicle, but it may be applied to something other than an engine mount. For example, the vibration isolator 10 may also be applied to a mount of an electric generator mounted on a construction machine or a mount of a machine installed, for example, at a factory.

Although preferred embodiments of the present invention have been described, the present invention is not limited to these embodiments. Additions, omissions, substitutions, and other modifications of the constitution are possible without departing from the spirit of the present invention. The present invention is not limited by the above description, and is only limited by the appended claims.

What is claimed is:
1. A liquid-enclosed vibration isolator, comprising:
  a first mounting member configured to have a tubular shape and connected to one of a vibration generator and a vibration absorber, and a second mounting member connected to the other of the vibration generator and the vibration absorber;
  an elastic body configured to elastically connect the first and second mounting members; and
  a partition member disposed within the first mounting member and configured to partition a liquid chamber within which a liquid is enclosed into a primary liquid chamber that uses the elastic body as a part of a wall surface thereof and a secondary liquid chamber,
    wherein the partition member is formed with a restriction passage configured to communicate the primary and secondary liquid chambers with each other,
  a porous body comprising a rigid body having a plurality of pores and arranged within a flow passage cross section of the restriction passage, the pores being disposed substantially in parallel with each other so as to communicate the primary liquid chamber and the secondary liquid chamber with each other,
    wherein the restriction passage includes a circumferential groove which extends in the circumferential direction.
2. The vibration isolator according to claim 1, wherein the pores are reduced in diameter in a direction moving from the secondary liquid chamber toward the primary liquid chamber.
3. The vibration isolator according to claim 2, wherein the porous body is disposed closer to the primary liquid chamber than the secondary liquid chamber.
4. The vibration isolator according to claim 3, wherein the porous body is disposed adjacent to the primary liquid chamber.
5. The vibration isolator according to claim 1, wherein the porous body is disposed closer to the primary liquid chamber than the secondary liquid chamber.
6. The vibration isolator according to claim 5, wherein the porous body is disposed adjacent to the primary liquid chamber.
7. The vibration isolator according to claim 2, wherein each of the pores has a length of about 2 mm, and wherein an opening diameter of each of the pores at a side of the primary liquid chamber is about 1.2 mm, and walls of each of the pores form a tapered angle of about 30° relative to a direction of flow of the liquid through the pores.

8. The vibration isolator according to claim 1, wherein a cross-sectional area of each of the pores is less than or equal to 25 mm$^2$.

9. The vibration isolator according to claim 8, wherein the cross-sectional area of each of the pores is less than or equal to 17 mm$^2$.

10. The vibration isolator according to claim 1, wherein the length of each of the pores is about 2 mm.

11. The vibration isolator according to claim 1, further comprising a guide that is open on the side of the primary liquid chamber and is shaped of an approximate circle when viewed from the top is formed at the other end side of the circumferential groove, wherein the opening of the guide whose flow passage cross-sectional area is sufficiently large compared to the circumferential groove.

12. The vibration isolator according to claim 1, wherein the porous body is fitted and screwed into the opening of the guide.

\* \* \* \* \*